Sept. 20, 1932.　　　　K. E. BEMIS　　　　1,878,258

SANDWICH TOASTER

Filed June 9, 1931

INVENTOR.
Kenneth E. Bemis
BY
Harry C. Schroeder
ATTORNEYS.

Patented Sept. 20, 1932

1,878,258

UNITED STATES PATENT OFFICE

KENNETH E. BEMIS, OF GLENDALE, CALIFORNIA

SANDWICH TOASTER

Application filed June 9, 1931. Serial No. 543,049.

This invention is a sandwich toaster, and is specially directed to an electrically heated appliance adapted to the toasting of buns, and broiling the sandwich filler.

The main object of the invention is to provide a device in which a bun may be toasted and the sandwich filler coincidently broiled by means of the same electrical heating unit.

Another object of the invention is to provide a device as outlined with means whereby the top half of a bun may be toasted, and a sandwich filler on the lower half may be broiled, the lower half being placed for broiling and removed by means of a knob operated slide to obviate burning the hands of the operator.

Other objects and advantages of the invention will become apparent as the following description is read on the drawing forming a part of this specification, and in which similar reference characters are used to designate similar parts throughout the several views, and in which.

Figure 1:
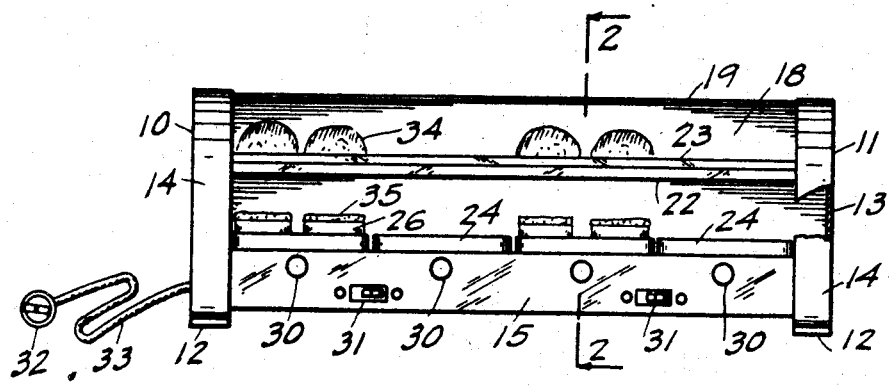
Fig. 1 is a front elevation of the invention, showing sandwiches in place as for toasting.

The invention consists of a cabinet formed of ends 10 and 11 having feet 12 formed both front and rear and consisting of an end wall 13 and an encompassing flange 14, and a body consisting of an operating cabinet having a front panel 15, a top 16 and rear panel 17 which is preferably formed of sheet metal.

The toasting cabinet is provided with a sheet metal back 18 and an overhanging shelf 19. Ledges 20 are affixed to the end walls 13 and provide supporting means for the heating unit and toasting plate.

Figure 2:
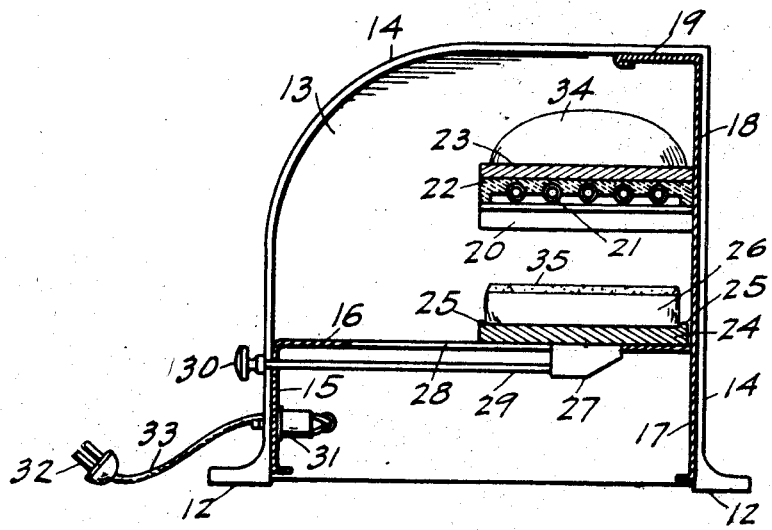
Fig. 2 is an enlarged section taken on line 2—2 of Fig. 1.
Figure 3:
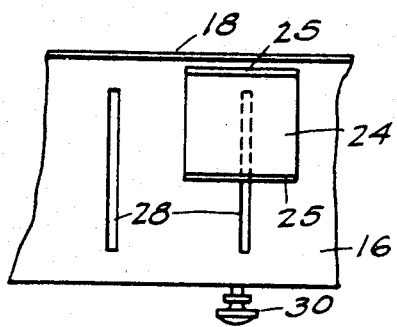
Fig. 3 is a fragmentary plan view of the griddle plate and bottom of toasting cabinet.

The heating unit consists of any of the usual types of units as are generally used for electric ranges, but is preferably made in a form in which the heating element is exposed below, such as is indicated in Fig. 2, in which a coil of element wire is threaded through a succession of apertures formed in spaced apart ears 21 which are integral with a heat resisting electric insulation body 22, which is mounted on the ledges 20 at opposite ends of the cabinet.

A toasting plate 23 is disposed on top of the heating unit and preferably secured thereto.

Griddle plates 24 are disposed beneath the heating unit and have an upwardly projecting curb 25 formed at each end, to prevent the bun 26 from sliding off, and also have a keel 27 intermediately disposed and which is slidable in a slot 28 formed in the top member 16. A rod 29 is secured to the keel 27 and extends through an aperture formed through the front panel 15. A knob 30 is fixed to the end of rod 29.

Switches 31 are in circuit with opposite ends of the heating element whereby half the element can be heated when desired.

A plug 32 and cord 33 provide for connection to any convenient outlet or lamp socket.

The device is operated by first connecting to an electric supply, cutting either or both ends of the heating element in circuit by means of switches 31, drawing one of the griddles 24 forward, splitting a bun, placing the top half 34 on the toasting plate 23, placing the filler 35 on the lower half 26 of the bun, placing the bun with filler on the griddle 24 and by pushing back on knob 30, placing the lower half of the bun with filler below the heating unit until properly broiled and toasted, then by drawing out the griddle 24 by means of knob 30, the toasted and broiled lower section of the sandwich is conveniently removed.

Having described an operative method of constructing and using the device, it will be understood that variations in construction and arrangement of parts which are consistent with the appended claim may be resorted to without detracting from the spirit or scope of the invention or sacrificing any of the advantages thereof.

I claim:—

A sandwich toaster comprising a cabinet, an electric heating unit extending throughout the length thereof and intermediately mounted, a toasting plate superposed on said unit, a base plate provided with a plurality of spacedly related elongated slots forming guideways, a plurality of griddles slidably mounted on said base plate and having each an integral keel extending downwardly through said slots, and means connecting with each keel for sliding each of said griddles independently of the others.

In testimony whereof I have affixed my signature.

KENNETH E. BEMIS.